United States Patent [19]
Choye et al.

[11] Patent Number: 5,842,024
[45] Date of Patent: Nov. 24, 1998

[54] METHOD OF SOFTWARE INSTALLATION

[75] Inventors: Randy J. Choye, Mission Viejo; Yau Leung Kung, Irvine; Henry N. Harding, Foothill Ranch, all of Calif.

[73] Assignee: AST Research, Inc., Irvine, Calif.

[21] Appl. No.: 876,688

[22] Filed: Jun. 17, 1997

Related U.S. Application Data

[63] Continuation of Ser. No. 397,652, Feb. 27, 1995, abandoned.

[51] Int. Cl.$^6$ ....................................................... G06F 9/445
[52] U.S. Cl. .............................................................. 395/712
[58] Field of Search ................................... 395/680, 712, 395/681, 200.51

[56] References Cited

U.S. PATENT DOCUMENTS 5,155,847  10/1992  Kirouac ..................................... 395/600
5,367,686  11/1994  Fisher ....................................... 395/700

*Primary Examiner*—Alvin E. Oberley
*Assistant Examiner*—Peter Stecher
*Attorney, Agent, or Firm*—Knobbe, Martens, Olson & Bear, LLP

[57] ABSTRACT

A method of reducing the time needed for installing a combination of software programs onto a hard disk drive by creating modules for each software program and associating a file with each software program that records all changes made to files and directories by the installation process of that software program. When downloading combinations of these modules onto a hard disk drive, a software installation program is run which implements the changes to files and directories necessitated by each of the modules thereby resulting in a disk operating system that is properly configured for the operation of the combination of software programs.

1 Claim, 2 Drawing Sheets

METHOD OF SOFTWARE INSTALLATION

This application is a continuation of U.S. patent application Ser. No. 08/397,652, filed Feb. 27, 1995, now abandoned.

FIELD OF THE INVENTION

This invention relates to a method of software installation, and more specifically to a method for reducing the time required by a computer manufacturer to install software onto a hard disk drive.

BACKGROUND OF THE INVENTION

A computer manufacturer typically pre-installs a plurality of software programs onto a hard disk drive of a computer system before the computer system is shipped to a reseller or end user. At a minimum, most computer manufacturers pre-install a disk operating system (DOS) and a graphical user interface (GUI). Currently, a majority of computer manufacturers pre-install Microsoft Corporation's version of a disk operating system called MS-DOS and Microsoft Corporation's version of a graphical user interface called Windows. Furthermore, more and more computer manufacturers are "bundling" a variety of additional software programs onto their computer systems to make them more attractive to the end user.

Although other versions of disk operating systems and graphical user interfaces are available, the terms DOS and Windows are used throughout this disclosure to refer to all types of disk operating systems and graphical user interfaces.

Since a diskette-by-diskette installation of each individual software program onto each hard disk drive of each computer system takes far too much time to complete, computer manufacturers implemented a faster method of installing a plurality of software programs onto the hard disk drive.

Basically, the computer manufacturer takes a particular model of a computer system that is to be shipped with a particular pre-installed bundle of software programs, and manually installs all of these programs diskette-by-diskette onto the hard disk drive, ensuring that all of the configuration files are properly modified.

It is well known in the art that certain software programs need to make certain modifications to what are known as configuration files, such as AUTOEXEC.BAT and CONFIG.SYS files in DOS, and SYSTEM.INI, PROGMAN.INI, and WIN.INI files in Windows, in order for the program to run properly. Other programs need to add certain files to certain directories in order for the program to run properly. Some of these changes are based upon specific hardware components that are present in the particular model of the computer system, such as a specific type of video card, or sound card, etc. Therefore, modifications made to the configuration files for one computer system model may not work if duplicated for use in another computer system model. The term "changes" is used to encompass additions, deletions, and modifications resulting from the installation of a software program.

Once the manual installation process is completed, the computer manufacturer then creates a compressed disk image file using an industry standard compression program called PKZIP, which is produced by PKWARE Inc. The compressed disk image file represents all of the properly installed software programs, properly modified configuration files, and properly added files, on the hard disk drive.

The computer manufacturer then uses this disk image file to rapidly duplicate the installation process on other computer systems by decompressing or "exploding" a copy of the compressed disk image file onto the hard disk drive that is installed in similar computer system models with the same bundle of software programs.

If the compressed disk image file for one computer system model is exploded and downloaded onto the hard disk drive of another computer system model, the configuration files may not be properly modified to work with the different hardware components present in the other model. Therefore, a different disk image file must be created manually for every different hardware and software configuration. This did not pose an immediate problem since many of the computer system models being shipped contained the same set of hardware components and software programs, and thus, the creation of only a few distinct disk image files were required. The use of a disk imaging method, as described above, greatly reduced the amount of time required by computer manufacturers to install predetermined bundles of software programs onto large numbers of similarly configured computer systems.

However, the disk imaging method did not provide enough flexibility, and as a result, created certain disadvantages. Computer manufacturers began shipping a large number of computer systems with different hardware and software configurations, and thus had to create a large number of distinct disk image files, thereby reducing the efficiency of the disk imaging method.

For example, in an effort to meet the needs and desires of each individual customer, computer manufacturers now offer what seems to be an endless combination of various hardware components and various software programs. The more combinations that the computer manufacturer offers, the less number of times that a particular disk image file is used, and the more number of times that a manual diskette-by-diskette installation has to be performed for a new combination.

Therefore, a better solution is required that provides the computer manufacturer with a fast, yet flexible, method of installing software onto the hard disk drive of various computer system models comprising various hardware components and software programs.

SUMMARY OF THE INVENTION

A method of software installation of the present invention for reducing the time required by a computer manufacturer to install software onto a computer system's hard disk drive provides the computer manufacturer with a fast, yet flexible, method of installing software onto the hard disk drive of various computer system models comprising various hardware components and software programs.

The method of software installation of the present invention utilizes a modular approach. Rather than creating a disk image of an entire hard disk drive comprising a plurality of pre-installed software programs, the modular approach implements individual modules for each and every software program that is available to the computer manufacturer for downloading onto the hard disk drive of the computer system.

When installing various software programs onto a computer system containing various hardware components, the computer manufacturer is basically concerned with the following things: (1) proper configuration of the operating system and graphical user interface such as DOS and Windows, (2) proper configuration of device drivers such as mouse drivers and video card drivers, (3) proper configuration of application programs such as word processors and spreadsheets, and (4) proper configuration of utility programs such as hard disk drive backup programs.

Typically, the operating system and graphical user interface are installed onto the hard disk drive first, and then the device drivers, followed by the applications and utilities. The installation of the device drivers, applications, and utilities typically require that certain changes be made to the configuration files or Windows directory. Again, it is noted that the term "changes" encompasses additions, deletions, and modifications. Therefore, to implement the modular method, the computer manufacturer loads each individual device driver, application, and utility separately. Each individual driver, application, or utility, is referred to as a single module.

Each device driver and application, or module, that is available for downloading is installed onto a computer system one by one. After each and every separate installation of one of these software programs or modules, all of the files on the hard disk drive are thoroughly checked to determine whether any changes have been made to certain files or directories, such as the configuration files, as a result of the installation of that single particular module. Any changes that are made to any of the files or directories resulting from the installing of that single particular module are recorded into a separate file associated with that module called a "script" file. Each module has an associated script file which specifies every change made to every file.

In this way, an endless number of various combinations of hardware components and software programs can be installed efficiently. For example, assume that an order has come in for a computer system equipped with a version A mouse, a version B video card, a version C word processor, and a version D spreadsheet. With the prior art disk imaging method, if this combination of hardware and software were new, a new disk image would have to be created, and therefore, no time is saved. However, with the modular method, the computer manufacturer simply installs the following modules onto the hard disk drive: the disk operating module, graphical user interface module, version A mouse device driver module, version B video card device driver module, version C word processor module, and version D spreadsheet module.

Since each module, with all of its necessary files and its associated script file, is compressed using an industry standard compression program called PKZIP, and then stored on a hard disk drive, CD-ROM, or other mass data storage device, downloading a new combination of various modules onto the hard disk drive for a new computer system is much quicker than the diskette-by-diskette method of software installation. Furthermore, since the script files for each module automatically implements all changes necessary for that module when the script file is executed, as further described below, the computer manufacturer does not have to spend additional time ensuring the proper installation and configuration of each individual module.

The way in which the script files automatically implement changes to the configuration files is as follows. In a preferred embodiment, a software installation program, called a Hard Disk Master (HDM) program, is loaded onto the hard disk drive along with all of the modules necessary to fulfill a specifically requested configuration. The software installation program runs a batch program called FIX$FILE.BAT and an execution program called SCRIPT.EXE. Once all of the module files, including its associated script file, are exploded and downloaded onto the hard disk drive, the FIX$FILE.BAT program runs the batch files associated with each installed module in the order that the modules are downloaded. The module batch files include an instruction to run the SCRIPT.EXE program. The SCRIPT.EXE program executes the script file associated with that module.

The SCRIPT.EXE and associated module script files are programmed such that the execution of each module's script file by the SCRIPT.EXE program implements the changes required by that particular module to the appropriate configuration files and directories, in order to make that module work properly.

For example, if the proper installation of the model A mouse device driver requires that a line such as "LOADHIGH C:\MOUSE\MOUSE" be written into the AUTOEXEC.BAT file, then the script file associated with the mouse driver module contains instructions which, when run by the SCRIPT.EXE program, implements these changes to the AUTOEXEC.BAT file.

Therefore, since all modules are preferably stored on a single mass data storage medium, and since all configurations are implemented automatically by the SCRIPT.EXE and associated module's script files, this modular method of software installation provides benefits not available with the prior art method of disk imaging.

Accordingly, it is an object of the present invention to reduce the time required by a computer manufacturer to install software onto a hard disk drive of a computer system.

Further objects and advantages of the present invention will become apparent from a consideration of the drawings and ensuing description.

DETAILED DESCRIPTION OF A PREFERRED EMBODIMENT

Figure 1:
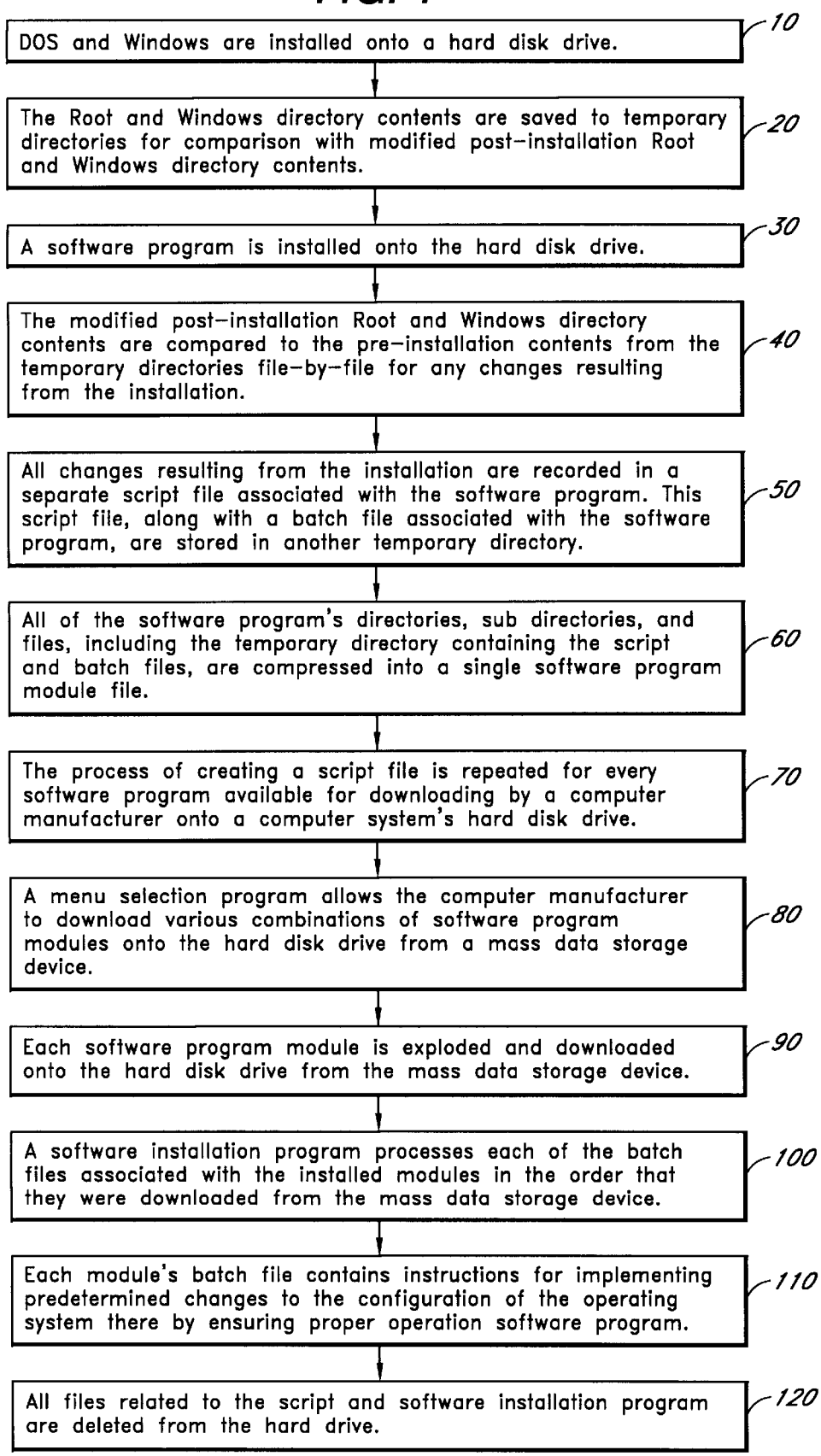
FIG. 1 is a flow chart of a method of software installation.

FIG. 1 is a flow chart of a method of software installation. The steps involved in the method of software installation of the present invention are described in greater detail below, with reference to FIG. 1.

In order to implement the method of software installation of the present invention, one of the first things that a computer manufacturer must do is determine the changes that a driver, application program, or utility program, makes to the Root, DOS, and Windows directories and files during installation of that particular program. Therefore, the computer manufacturer installs DOS and Windows onto a computer system 300, as shown in box 10. The Root, DOS, and Windows directory contents are then saved to a temporary directory, as shown in box 20, so that after the installation of a particular software program, changes in the Root, DOS, and Windows directory contents can be compared to the original contents stored in the temporary directory.

For purposes of terminology, a disk operating program, a graphical user interface program, device drivers, utility programs, and application programs, are referred to herein as software programs, and the use of the term software program is meant to represent these various types of programs. Each of these software programs are installed individually, mutually exclusive of other software program installations, so that the exact changes directly attributable to that particular software program can be determined, as shown in box 30.

One by one, every software program that the computer manufacturer currently makes available in an end product is installed, and the resulting Root, DOS, and Windows directory contents are compared to the original contents, in order to determine the changes made. For example, assume that the particular computer system 300 is to be shipped with a model A mouse. The computer manufacturer therefore needs to create a module for the mouse driver software program. As shown in box 30, the mouse driver software is installed onto the computer system 300. Upon successful installation, the Root, DOS, and Windows directory contents are compared to the original contents, as shown in box 40. Assume, for the purpose of this example, that the only change made is the addition of a single line to the AUTOEXEC.BAT file in the Root directory. The added line reads as follows: "LOADHIGH C:\MOUSE\MOUSE."

Any changes made to any files resulting from the installation of the software program, in this case the addition of a single line to the AUTOEXEC.BAT file, are recorded in a separate "script" file associated with that software program and stored in a temporary directory, as shown in box 50. These script files are basically files containing predetermined changes to the configuration of DOS and Windows. A corresponding batch file is created to run the script file.

Figure 2:
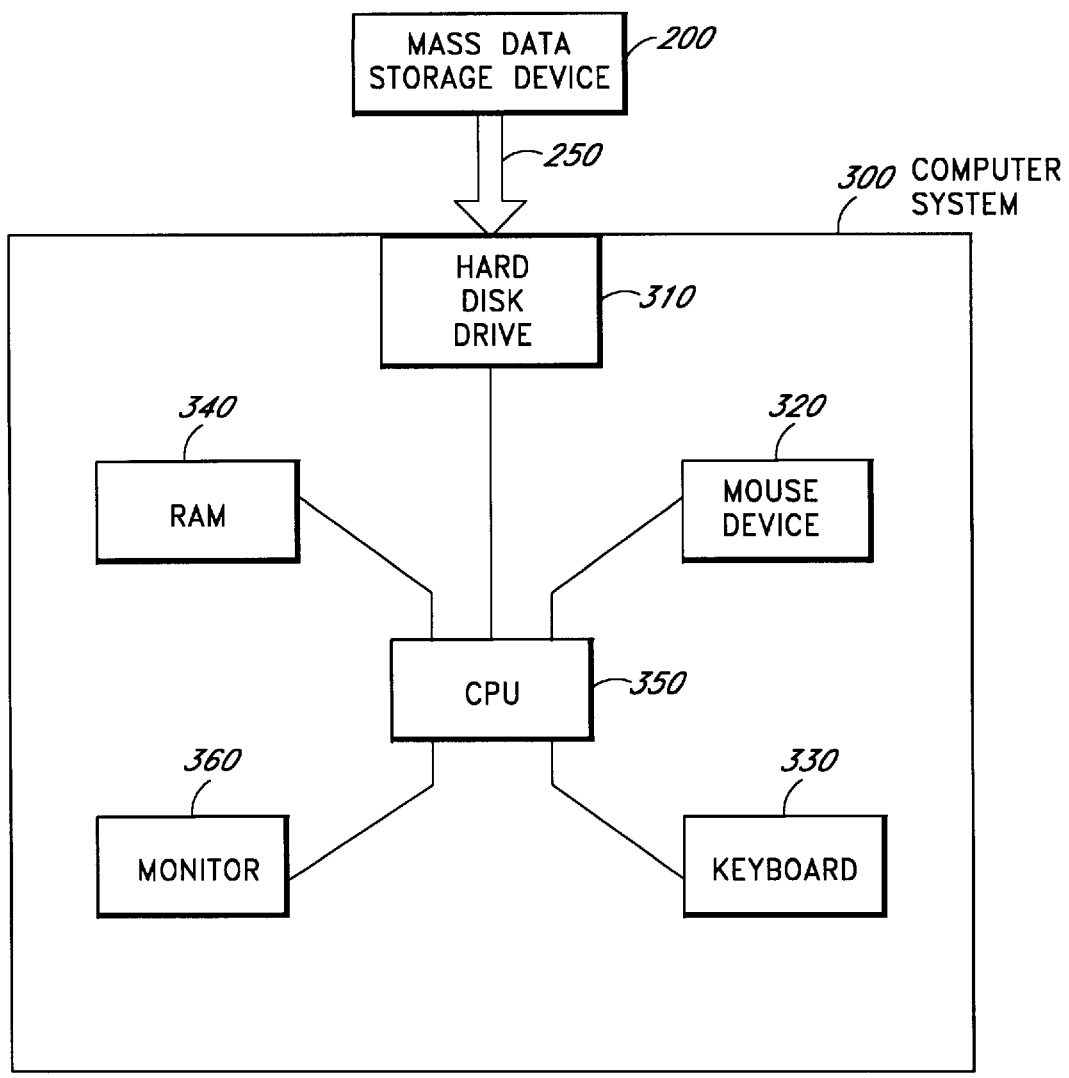
FIG. 2 is a block diagram illustrating a connection of a mass data storage device with a hard disk drive of a computer system to facilitate the downloading of modules from the mass data storage device to the hard disk drive.

As shown in box 60, the directories, subdirectories, and files installed by a particular program, plus the temporary directory containing the script file and batch file associated with that software program, are all compressed into a module using an industry standard compression utility program called PKZIP. Then, when the module is later decompressed, all of the software program's directories, subdirectories, and files are exploded onto a hard disk drive 310 (as shown in FIG. 2), along with the temporary directory containing the script and batch files.

For example, assume that after successful installation, a word processor program creates a directory called WP and a subdirectory called TUTOR. Then the module for this software program includes the WP directory, the TUTOR subdirectory, all of the files in the WP directory and TUTOR subdirectory, and the temporary directory containing a script file called WP.SPT and a batch file called WP.BAT. All of this data is compressed into a single file, called the word processor module, by the PKZIP compression program.

In the method of software installation of the present invention, once a module is created for each software program, as shown in box 70, there is no more need for a diskette-by-diskette installation to be performed. This is not true with the disk imaging method, where only a slight change in a hardware or software bundle configuration required the reinstallation of many of the same software programs over and over again using the diskette-by-diskette process.

One of the benefits of the present invention is the simplicity in which various combinations of software programs are downloaded to the hard disk drive 310. For example, assume that the computer system 300 is to be configured with DOS, Windows, a model A mouse driver, a model B video card driver, a model C word processor, and a model D spreadsheet. The computer manufacturer simply loads all of the modules for all of the software programs onto a mass data storage device 200 (as shown in FIG. 2). A menu system is used which assigns a distinct part number to each software program module, or software program bundle. Assume that the part numbers for the six requested modules above are 111, 222, 333, 444, 555, and 666, or that the part number for that particular software bundle is 99999. Then the computer manufacturer simply inputs the appropriate numbers to the menu system to request this combination of software. No diskette-by-diskette installation is required even if such a combination of software has never been prepared before.

Note that the DOS and Windows modules do not have a temporary directory or an associated script file. The DOS and Windows modules only contain the directories, subdirectories and files associated with the DOS and Windows software program respectively, since changes to the DOS and Windows programs are typically made by the installation of other software programs.

As shown in FIG. 2, the hard disk drive 310 of the computer system 300 is connected to the mass data storage device 200 to facilitate the downloading of various modules onto the hard disk drive 310. The hard disk drive 310 is placed in the computer system 300 that it is to be shipped with, and this computer system 300 is connected to the mass data storage device 200 such that the selected modules for that particular computer system 300 are downloaded to that computer system's 300 hard disk drive 310.

However, the particular hard disk drive 310 can also be installed into another computer system (not shown) after this downloading process. The hard disk drive 310 does not necessarily have to be in the computer system 300 that it will eventually be shipped in, so long as the modules being downloaded onto the hard disk drive 310 correspond to the computer system (not shown) in which the hard disk drive 310 will eventually be shipped.

Typically, software program modules are downloaded from the mass data storage device 200 to the hard disk drive 310 via a parallel port connection, or a network connection between the mass data storage device 200 and the computer system 300. Various implementations for downloading data from the mass data storage device 200 to the hard disk drive 310 are known in the industry, and is not new. It is to be understood that the specific implementation used to implement the method of the present invention is not important. Many various implementations are known and can be adapted to the present method.

Therefore, by simply entering the number or numbers associated with the desired software programs into the menu system, as shown in box 80, the mass data storage device 200 retrieves the selected software program modules, downloads and explodes the directories, subdirectories, and files associated with the selected software programs, including the temporary directory containing the script and batch file, to the hard disk drive 310, as shown in box 90.

After the computer manufacturer finishes exploding all of the selected modules onto the hard disk drive 310, a temporary directory, called TEMP for illustrative purposes, now contains the script and batch files for the mouse module, the video card module, the word processor module, and the spreadsheet module. The computer manufacturer also downloads a software installation program onto the hard disk drive 310. The software installation program comprises a program called FIX$FILE.BAT and a program called SCRIPT.EXE. The purpose of the FIX$FILE.BAT program is to execute all batch files associated with each module in the order that they are downloaded from the mass data storage device 200, as shown in box 100.

FIX$FILE.BAT executes each module's batch program which runs each modules's script file located in the TEMP directory in the order that the modules are downloaded onto the hard disk drive 310. There are certain situations in which the operation of a certain software program depends upon whether that program is downloaded before or after certain other programs. Therefore, the computer manufacturer structures the menu selection system such that the download order of the selected modules will not create operational problems based upon load order.

In the present example, the batch files in load order are, for illustrative purposes, called the MOUSE.BAT, VIDEO.BAT, WRDPRCSR.BAT, and SPRDSHT.BAT files. As shown in box 110, the MOUSE.BAT file, for example, contains an instruction line that reads "SCRIPT.EXE MOUSE.SPT." This instruction runs the SCRIPT.EXE program which implements the changes recorded in the MOUSE.SPT file. The MOUSE.SPT is the script file for the mouse module, and contains all changes made to the Root, DOS, and Windows directories as a result of the installation of the mouse software program. The MOUSE.SPT file contains lines that read "%C:\AUTOEXEC.BAT" and "PATH= ^LOADHIGH C:\MOUSE\MOUSE." Based upon predetermined instruction codes defined by the computer manufacturer, these two lines instruct the computer system 300 to place the line "LOADHIGH C:\MOUSE\MOUSE" directly above the "PATH" line in the AUTOEXEC.BAT file of the Root directory.

The FIX$FILE.BAT then runs the VIDEO.BAT, WRDPRCSR.BAT and SPRDSHT.BAT files which in turn runs the SCRIPT.EXE files which implement the changes that are recorded in a VIDEO.SPT, WRDPRCSR.SPT and SPRDSHT.SPT script files, as shown in box 110.

In this way, each module is responsible for updating the Root, DOS, and Windows directories so that that particular module operates properly. Since each module carries its own instructions for implementing its necessary changes, various different combinations of modules do not increase the amount of work required, as would be required by the prior art disk imaging method.

Once all of the module batch files are run, all of the script and FIX$FILE associated files are deleted from the hard disk drive 310, as shown in box 120, and the installed software is now properly configured for all of the installed software program modules. This process significantly reduces the time necessary for the computer manufacturer to create various new combinations of software bundles.

FIG. 2 shows the hardware elements associated with the method of software installation of the present invention. The mass data storage device 200 is in communication with the computer system 300 via a data bus 250. The mass data storage device 200 can be a stand-alone computer system (not shown) or part of a computer network (not shown). Typically, the mass data storage device 200 is a very large hard disk drive (not shown) although it could also be a plurality of CD-ROMS or other data storage devices (not shown).

The computer system 300 comprises the hard disk drive 310. The method of software installation of the present invention works whether the hard disk drive 310 is to be shipped with the computer system 300, or whether the hard disk drive 310 is to be shipped with another computer system (not shown) so long as the modules being exploded and downloaded onto the hard disk drive 310 correspond to the computer system, 300 or otherwise, that the hard disk drive 310 will eventually be shipped in.

The typical computer system 300 further comprises a mouse 320, a keyboard 330, internal random access memory 340, and a central processing unit 350. All of these components are interconnected through, or in communication with, the central processing unit 350. Most computer systems 300 are not sold with a monitor 360. Monitors 360 are usually sold separately.

While the above description contains many specificities, these should not be construed as limitations on the scope of the invention, but rather as an exemplification of preferred embodiments thereof. Many other variations are possible. For example, while MS-DOS and Windows are used in a preferred embodiment, many other disk operating systems and graphical user interfaces are available which can be adapted to the above disclosed methods of software installation and setup. The term "operating system" shall be given its broadest meaning throughout the specification and claims, and is meant to encompass disk operating systems, as well as graphical user interface operating environments.

Furthermore, Microsoft Corporation's Windows graphical user interface in its current version is more of an operating environment than an operating system. However, it is well known in the industry that Microsoft Corporation is developing a new generation of operating software presently called Windows 95. Windows 95 is a graphical user interface that is also a disk operating system, and not just a disk operating environment. It is to be understood that the method of software installation described above can be implemented by a person of ordinary skill in the art to any disk operating system, regardless of whether a graphical user interface is integrated into the operating system or not.

Moreover, it is to be understood that the mass data storage device encompasses a CD-ROM, and an end user may use a CD-ROM player to download data from the CD-ROM to the hard disk drive according to the methods claimed herein.

Appendix A comprises printouts of software programs relevant to the software installation program discussed above.

```
@dit @ECHO OFF
rem Mods:
rem 05/04/94:
rem 1)   New method.  Uses DOS' load order of .bat - no more ins_apps.bat!
rem 2)   Add DOS boot sector fixup code here so that our DOS DISKH's can
rem      remain generic for std builds as well as custom modular builds.
rem 3)   Add Notebook fixups:
rem      a) move \tmp2 to \temp for Mfg to run worldkbd.bat
rem      b) check if \tmp2 dir is present - if so, then we know it's a
rem         notebook, so tweak Windows to reflect MS-DOS System with APM.
rem      c) CHAMELEON ONLY - if ASC900xx.SDU exists, then make sure we
rem         put the ZDISK110.SDU/.AST files into \ASTDU.  Also put a
rem         copy of ZDISK.EXE on the hard drive.
rem 4)   7/14/94, HNH, Added support for Fiji 2:  If ASTWORKS...
rem      Put focus on main, arrange group icons, new main and acc groups.
rem 5)   7/20/94, RJC, Add logic to check if APM already installed by the
rem      Power Management Enable DISKHM 911438-931.  If true, don't process
rem      notebook.exe (see comment 3b above).
rem 6)   7/25/94, HNH, Add script (SDRB4MSC.SPT) to arrange the MSCDEX line
rem      before the smartdrv line.  (Ft. Worth says it causes problems in
rem      AST Works).
rem 7)   08/04/94, HNH, Remove Windows swap file win386.swp and spart.par.
rem      Mod for AST Works because they don't want to cd master a swap file.
rem 8)   08/05/94, RJC, Remove the Chameleon-specific fixup to add the
rem      ZDISK program and DU image - it is now being added via its own
rem      DISKHM module 911586-931 ASTDU F/ZDISK v1.30 R1.00.
rem 9)   08/25/94, GJS,HNH -- added ability to merge windows *.reg files.
rem 10)  09/22/94, HNH - Do not remove VBRUN300.DLL.  Use AST_FA instead
rem      of DOS' ATTRIB.
rem 11) 1139940a, 10/14/94, HNH 1)  Rename WINDOWS\WINSTART.BAT to .TAB before
rem      running iconfix.  Winstart runs programs from Windows we don't want.
rem      2)  Let tester know that there is a C:\ERROR.LOG that gets created
rem          by the SCRIPT program if there are SCRIPT errors.
rem      3)  Set env. variable ICONFIX=ERROR if SCRIPT errors - for mfg.
rem 12) 1139941A, 11/07/94, RJC 1) Save/Restore "virgin" copy of
rem      \DOS\WNTOOLS.GRP so that launching Windows during fixup doesn't
rem      "lose" the icon properties for Microsoft Tools group.  Windows
rem      wants to re-establish icon properties during save on exit, but
rem      because the group file is not in current directory, it gets lost.
rem      This fixes the reported problem of the Microsoft Tools group
rem      icons being "wrong".
rem      2), HNH, Fix the windows\winstart.bat to just ren winstart.bat.
rem 13) 1139942a, 11/29/94, HNH
rem      1)  Remove lines that scripted the mscdex line below smartdrv.
rem      2)  Ft. Worth-Jory Irvine removed lines that ran windows.
rem      3)  Ft. Worth-Jory added arrange icons.
rem      4)  HNH - Pipe output to %log_file%.
rem 14) 1139943a, 01/09/95, HNH
rem      1)  Added more %log_file% to correct -942.
rem      2)  Updated SCRIPT.EXE to handle to NUL.
```

Fix$file.bat

Page A-1

```
rem 1139942a+ Add log_file or NUL support:
if "%log_file%" == "" set log_file=nul cd\windows\system
IF NOT EXIST VBRUN300.DLL COPY C:\TEMP\VBRUN300.DLL >> %log_file%
cd\
if exist c:\bootimg.exe call c:\bootimg W /fc:\boot.img >> %log_file%
if exist c:\bootimg.exe erase c:\bootimg.exe >> %log_file%
if exist c:\boot.img erase c:\boot.img >> %log_file% c:
if exist c:\tmp2\worldkbd.bat goto notebook
if exist c:\temp\ascentia.bat goto notebook
goto continue
:notebook
if exist c:\temp\powrmgmt.bat goto apmdone
rem Explode necessary Windows files to support APM, and notebook.bat/spt
rem files into \temp to be processed as normal.
c:\temp\notebook.exe -d -o c:\ >> %log_file%
:apmdone
:continue cd\temp
rem This will do what INS_APPS.BAT used to do but we don't have to update
rem INS_APPS.BAT every time there's a new app!

cd\temp
rem ++++++++ hnh
rem This deletes an inaccurate portion of the embedding
section./ex=(exclusive)
delsectn c:\windows\win.ini c:\temp\win.new PBrush /ex >> %log_file%
copy c:\temp\win.new c:\windows\win.ini >> %log_file%
del c:\temp\win.new >> %log_file%
rem -------- hnh for %%f in (*.bat) do if exist %%f call %%f rem +++++++++ Glenn
rem This deletes compressed files in windows\system directory
cd \windows\system
if exist *.fo_ del *.fo_ >> %log_file%
if exist *.tt_ del *.tt_ >> %log_file%
if exist *.sc_ del *.sc_ >> %log_file%
if exist *.bm_ del *.bm_ >> %log_file%
rem ---------- Glenn
cd\temp REM 113942A+
REM  Jory 12/06/94 - Following line sets up the shell=MC.EXE line in
SYSTEM.INI
script sys_shel.spt >> %log_file%
REM 113942A- rem 1139940a+
if exist c:\error.log SET FIXUPERROR=ERROR
rem 1139940a+ rem +++++++ Section for Fiji 2.  If C:\ASTWORKS\nul exits if not exist c:\astworks\nul goto noAworks
```

Fix$file.bat   Page A-2

```
cd\windows rem NO astdu in main:
copy c:\temp\main.grp >> %log_file% rem Put astdu in accessories:
copy c:\temp\accessor.grp >> %log_file% rem NO astdu in startup:
copy c:\temp\startup.grp >> %log_file%
CD\
rem 1139942a - Removed scripting of mscdex below smartdrv.

rem ----------------------------------------------------------------

:noAworks
REM Glenn +++++++ Merge *.reg files, arrange icons here
if exist c:\windows\reg.dat del c:\windows\reg.dat >> %log_file%
cd\
dir *.reg /s/b > reg.txt
cls
REM ++++++++++++++

REM 1139941A+
if exist c:\dos\wntools.grp copy c:\dos\wntools.grp c:\dos\wntools.sav >>
%log_file% if exist c:\dos\wntools.sav copy c:\dos\wntools.sav c:\dos\wntools.grp >>
%log_file%
if exist c:\dos\wntools.sav del c:\dos\wntools.sav >> %log_file%
REM 1139941A-

REM 1139942A+
REM Jory 12/06/94 - following line arranges icons in Program Manager
c:\temp\grpfiles >> %log_file%
REM 1139942A- rem 1139940a-
rem set focus to main=1: Changes progman.ini order= 4 3 2 1
c:\temp\pmsetfoc 1 >> %log_file% rem I (HH) moved makesave.bat into root because ASTWORKS section would
rem run it as a regular batch file which would copy the files to
rem c:\ast-works before Windows ran - which is not what we want.
call makesave
cd\
del makesave.bat >> %log_file%
cd temp
if exist *.* c:\removeit /q *.* >> %log_file%
cd..
rd temp
md temp rem The temp dir is removed because we don't want our .SPT files looked at.
rem If WORLDKBD.BAT exists or tmp2, then copy into TEMP for mfg can run it
rem after ICONFIX's FIX$FILE.BAT. Don't delete C:\TEMP after tmp2 in copied!

if not exist tmp2\*.* goto nofiles copy c:\tmp2\*.* c:\temp\*.* >> %log_file%
```

Fix$file.bat   Page A-3

```
cd tmp2
if exist *.* c:\removeit /q *.* >> %log_file%
cd..
rd tmp2

:nofiles
del c:\removeit.exe >> %log_file% if not "fixupnostop"=="" if exist c:\error.log del c:\error.log >> %log_file%
if not "fixupnostop"=="" goto nostop
if exist c:\error.log echo Error - Read C:\ERROR.LOG for Script errors!
if exist c:\error.log PAUSE
if exist c:\error.log type c:\error.log :nostop rem During ULM when log_file=NUL, don't say "All done!"

if "%log_file%" == "nul" goto noTalk
if "%log_file%" == "NUL" goto noTalk

@Echo All Done with FIX$FILE.BAT!
:noTalk
rem end of file.
```

*Fix$file.bat*

Page A-4

```
//---------------------------------------------------------------------------
// File: Script.c
// Purpose: Updates any text file's lines with new ones.
// Called by: DOS command line prompt: SCRIPT.EXE <file_name>, (e.g. SCRIPT
//            CONFIG.SYS).
// Calls: Supporting Script local functions.
//
// History
//
// Date       Who     Descriptions
// ---------------------------------------------------------------------------
// 6/10/92    J.L     First release.
//
// 7/92       Y.L.    Rel 1.00.01
//
//                    Enhancement:
//                    1. Path and file name of script file is now
//                       specified in the command line. It was
//                       hard coded that the script file must have
//                       a file name:"SCRIPT.WIN" and must be in
//                       "C:\WINDOWS" subdirectory.
//                    2. Steamline the codes.
//                    3. Add error handling routines to detect any
//                       abnormal cases.
//                    4. Add "APPEND" function. <keyword>=+
//                    5. Add "INSERT BEFORE" function <keyword>=^
//                    6. Add comments and bug fixed.
//                    7. Display message while processing.
//
// 10/15/92   Y.L.    Rel 1.00.02
//
//                    Bugs fixed:
//                    1. incorrect recsize at case "insertion" for
//                       non-ini files.
//                    2. '[' may appear in the statement in .ini files.
//                    3. Don't create BAK files.
//
// 03/19/93   Y.L     Rel 1.00.03
//
//                    Enhancement:
//                    1. Add "INSERT BEFORE" function for .ini files.
// 09/24/93   Y.L.    Rel 1.00.04
//
//                    Changes:
//                    1. Rename original file to BAK file and rename
//                       it back to original of an error occurred.    YLK001a
// 09/24/93   HNH001      Rel 1.00.04
//                    2. If sucess, exit with a 0.          HNH001a
//                    3. Fix problem where it was running out of HNH001b
//                       file handles.
//                    4. Added check for environment variable check for
//                       Hard Disk Master Group "HDMGROUP=662". If this is
//                       true, and there is an error, then pause.    HNH001c
// 05/09/94   HNH002      1. Bumped RECMAXLEN from 144 to 200
// 10/15/94   HNH003  1139940A, 1) Added HDMGROUP=662 if needed,
//                              2) Make C:\ERROR.LOG if errors are found.
//                              3) Fix [section] in comments bug. See: ORIG:
//
// 12/21/94   HNH004  1139943A, 1) Added log_file support to send msgs to nul.
//                    Error messages will still go to screen regardless.
//---------------------------------------------------------------------------

/* mbufpt -> the starting address in memory, msize = sizeof(script.win) */
/*                                                  + sizeof(?????.ini)  */
/* msize is the size of (ssize+isize) */
/* mtail -> the last byte of a string in mbufpt, not the last byte of mbufpt
*/
```

```
/* ssize   is the size of sizeof(script.win) file */
/* isize   is the size of sizeof(??????.ini) file */
/* sbuf    is the buffer of a record from script.win file */
/* ininame is the buffer of ?????.ini filename */
/* secname is the buffer of section name from script.win file */
/* recsize is the length of a record from script.win file */
/* seclen  is the length of a section name */
/* EX:     _____      */
/*        | [ | W| i| n| d| o| w| s| ]|0d|0a|  |  |  |  |  |   */
/*        |__|__|__|__|__|__|__|__|__|__|__|__|__|__|__|__|   */
/*         ^                                                   */
/*  mbufpt points to the starting address of above buffer     */
/*  msize = 18                                                 */
/*  mtail = 11                                                 */
/*  winmode = 1 -> Windows text file format                    */
/*          = 0 -> non-Windows text file format                */
/*  testmode = 1 -> entry name compare                         */
/*           = 0 -> section name compare                       */
/*-----------------------------------------------------------*/ include <dos.h>                    // HNH003 1139940A
include <fcntl.h>
#include <sys\types.h>
#include <sys\stat.h>
#include <io.h>
#include <stdio.h>
#include <ctype.h>
#include <string.h>
#include "astver.h"
include <stdlib.h>                 /* For getenv(),putenv() HNH001c */ define  RECMAXLEN    144           // was 144. HNH define  INPUT_ERROR      0x01
define  LINE_ERROR       0x02
#define  INI_ERROR        0x03
#define  EQUSIGN_ERROR    0x04
#define  NOEQU_ERROR      0x05
#define  WRITE_ERROR      0x06
#define  MEM_ERROR        0x07
#define  SECTION_ERROR    0x08
#define  NOFILE_ERROR     0x09
#define  SCRIPT_ERROR     0x0A
define  LEN_ERROR        0x0B char  *script;
char  *mbufpt;
long  msize,mtail,ssize,isize;
char  cbyte,sbuf[RECMAXLEN+1],ininame[80],secname[40];
int   hscript,hini,recsize,iniexist,secexist,seclen,winmode,testmode;
FILE  *fscript;
FILE  *ferr;             // HNH003, 1139941a revision Revision = { 0xFE, BANNER_AND_VERSION, COPYRIGHT };

// HNH001c+
int strcmp(const char *s1, const char *s2);
char *getenv(const char *name);
//int putenv(char *putenvstr);
// HNH001c- main(argc, argv)
int argc;
char *argv[];

{
   char  ch;
```

Script.c Page A-6

```c
if (stricmp(getenv("LOG_FILE"),"NUL") != 0) {    // 1139943A, HNH004
    printf("%s\n",Revision.banner);
    printf("%s\n\n",Revision.copyright);
}

//
// check if script file is specified in command line
//
if ( argc != 2 || (argv[1][0]=='/' && argv[1][1] == '?'))
    error(INPUT_ERROR);                          // display error and exit script=&argv[1][0];
iniexist=secexist=0;

if ((hscript=open(script,O_BINARY))==-1)
    error(SCRIPT_ERROR);                         // display error and exit ssize=filelength(hscript);
close(hscript);
fscript=fopen(script,"r+t");
recsize=getrec(fscript,sbuf);
while (!feof(fscript))
{
    ch=sbuf[0];
    switch(ch)   /* check the 1st byte */
    {
        case '$':  /* mbufpt will point to whole INI file in memory */
        case '%':  /* winmode = 0 -> non-Windows */
            winmode = (ch=='%' ? 0 : 1);
            secexist=0;
            if (iniexist)
                    /*    iniexist will be off after write       */
                writeini();
                    /*    iniexist will on, if OK after read     */
            readini();
            break;

case '/':
        case ';':
        case '\n':
        case '\0':
            break;

case ' ':
            error(LINE_ERROR);                   // display error and exit
            break;

case '[':
            if (!iniexist) error(NOFILE_ERROR);
            secexist=testmode=0;
            if(seclen=getsecname())              // get section name
            {
                if(compattern(mbufpt,mtail,secname,seclen)==-1)   //
                    secinsert();                 // section not found
                else
                    secexist=1;                  // found the section
            }
            break;

default:
            ((winmode==1)?procwin():procdos());
            break;
    }
    recsize=getrec(fscript,sbuf);
}
```

*Script.c* Page A-7

```
fclose(fscript);  /* close script.win file */
if (iniexist)
       /*     iniexist will be off after write          */
writeini();

if (stricmp(getenv("LOG_FILE"),"NUL") != 0)    // 1139943A, HNH004
    printf("Process complete.\n");
exit(0);                                /* HNH001a */
}
```

```
//----------------------------------------------------------------
// Function : getrec
// Purpose: Read one line from the script file. The length of the line cannot
//          be greater than RECMAXLEN and will be returned to the caller.
// Called by: main
// Calls: C library functions.
//---------------------------------------------------------------- getrec(handle,buf)          /* get one record from script file until */

FILE  *handle;              /* eof or \n.  max record length <=RECMAXLEN */
char  *buf;                 /* return record length to calling          */
    /* Read in one record according current handle position */
{   /* Return a ASCIIZ string in buf */
    char  ch;
    int   i;
    int   iLen, j;          // hnh, 2/8/95 ch=fgetc(handle);
    for (i=0;(i<RECMAXLEN)&&(feof(handle)==0) && (ch!='\n');i++)
    {
        buf[i]=ch;
        ch=fgetc(handle);
    } buf[i]='\0';

return(i);
}
```

Script.c

Page A-9

```
//-------------------------------------------------------------------------
// Function : readini
// Purpose: Allocate memory and read the whole file into the memory.
// Called by: main
// Calls: getininame(), C library functions.
//------------------------------------------------------------------------- readini()
{
   getininame();

close(hini);              /* close any files. HNH001b */ if ((hini=open((char *)ininame,O_BINARY))==-1)
      error(INI_ERROR);                                 // display error and exit
   else
   {/* set allocmemsize */
      isize=filelength(hini);                           // get file size
      msize=isize+ssize;                                // total memory required
      mbufpt=(char *)malloc(msize*sizeof(char));        // allocate memory
      if (mbufpt == NULL)
         error(MEM_ERROR);                              // display error and exit memset(mbufpt,0x20,msize*sizeof(char));           // init memory
      lseek(hini,0L,SEEK_SET);
      read(hini,mbufpt,isize);                          // read file to memory
      close(hini);                                      // close file
      mtail=isize-1;                                    // point to the end of file
      if (mbufpt[mtail]=='\x01a')
         mtail--;
      if (mbufpt[mtail]!='\n')
      {/* append 0d 0a at the end if there are none */
         mbufpt[mtail+1]='\x00d';
         mbufpt[mtail+2]='\x00a';
         mtail+=2;
      }
      if (stricmp(getenv("LOG_FILE"),"NUL") != 0)   // 1139943A, HNH004
         printf("Updating file: %s ...... ",ininame);

iniexist=1;                                       // file is in memory
   }
}
```

Script.c Page A-10

```
//----------------------------------------------------------------
// Function : writeini
// Purpose: Save file and rename the original file to .BAK file.
// Called by: main
// Calls: C library functions.
//---------------------------------------------------------------- writeini()
{
    static char temp[80];                                // for .BAK filename
    char  *bakname=temp;
    char  *dotpt;
    int   hnewini;
    unsigned int   icount;

// YLK001a+
//  1.00.02 - don't create backup file
//    /* rename existing .INI file to .BAK */
    bakname=strdup(ininame);
    dotpt=strchr(bakname,'.');
    dotpt[1]='B';
    dotpt[2]='A';
    dotpt[3]='K';
    dotpt[4]='\0';

if ((hnewini=open((char *)bakname,O_BINARY))!=-1)
        remove((char *)bakname);
    rename(ininame,bakname);

if ((hnewini=open((char *)ininame,O_BINARY))!=-1)
        remove((char *)ininame);
    hnewini=open((char *)ininame,O_CREAT|O_BINARY|O_WRONLY);
    mbufpt[++mtail]='\x01a';   /* insert EOF mark */
    if (write(hnewini,mbufpt,mtail)==-1)                 // check if error
        {
        remove((char *)ininame);   /* Rename to original file. */
        rename(bakname,ininame);
// YLK001a-
        if (stricmp(getenv("LOG_FILE"),"NUL") != 0)      // 1139943A, HNH004
            printf("\n");
        error(WRITE_ERROR);                              // display error and exit
        }
    close(hnewini);
    rename(ininame,bakname);      /* HNH001c */
    remove((char *)bakname);      /* Delete .BAK file. HNH001c*/
    free(mbufpt);                                        // release memory
    if (stricmp(getenv("LOG_FILE"),"NUL") != 0)          // 1139943A, HNH004
        printf("Done\n");
    iniexist=0;
}
```

*Script.c* Page A-11

```
//----------------------------------------------------------------------
// Function : getininame
// Purpose: Get the filename from the text file and put it in ININAME[].
// Called by: readini
// Calls: C library functions.
//----------------------------------------------------------------------
getininame()
{
   int  sour,dest;

for(sour=1,dest=0;sbuf[sour]!='\0';sour++,dest++)
      ininame[dest]=sbuf[sour];
   ininame[dest]='\0';
}

//----------------------------------------------------------------------
// Function : getsecname
// Purpose: Get the section name from the text file and put it in SECNAME[].
//          The length of the section name is also returned to caller.
// Called by: main
// Calls: C library functions.
//----------------------------------------------------------------------
getsecname()
{
    int  i,j,len;

len=strlen(sbuf);
    for(i=0,j=0; i<len; i++)
    {
       if (sbuf[i]=='[')
          j++;
       else if (sbuf[i]==']')
          j--;
       else;
    }
    if (j != 0) return(0);
    for(i=0; i<len; i++)
    {
       if (sbuf[i] == ']')
          break;
       secname[i]=sbuf[i];
    }
    secname[i]=sbuf[i];
    i++;
    secname[i]='\0';
    return(i);
}
```

*Script.c*

```
//----------------------------------------------------------------------
// Function : chkrec
// Purpose: Check if the record has an '=' sign.
// Called by: main
// Calls: error() and C library functions.
//----------------------------------------------------------------------
chkrec()
{
   int   equsign;
   char  *ptequ;

ptequ=strchr(sbuf,'='); /* return zero if not found */
   if (ptequ)     /* '=' sign is found in sbuf[] */
   {
      equsign=ptequ-sbuf;
      if (sbuf[equsign-1] == ' ')
      /*  || (recsize > equsign && sbuf[equsign+1] == ' ')) */
           error(EQUSIGN_ERROR);                          // display error and
exit
      else
           return(1);     /* record OK */
   }
   else
      error(NOEQU_ERROR);                                 // display error and
exit
   return(0);
}
```

Script.c Page A-13

```c
//-----------------------------------------------------------------
// Function : procwin
// Purpose: Read Windows section [...]
// Called by: main
// Calls: compatterns, recdelete, and C library functions.
//----------------------------------------------------------------- procwin()
{
    long  secstart,secend,recstart,findstart,findend;
    long  i,j;
    int   equsign, equhere=0;
    char  *ptequ;

if (!iniexist) error(NOFILE_ERROR);
    if (!secexist) error(SECTION_ERROR);

chkrec();

ptequ=strchr(sbuf,'=');
    equsign=ptequ-sbuf;    /* get the offset of '=' in sbuf[] */

/* secstart is the offset of a section relative to the beginning of mbufpt
    */
    /* EX: [Boot]0d0adisplay=0d0a[Windows]0d0a...secstart of [Windows] = 19 */
    /*     1234567 8 901234567 8 9*/
    /*     recstart of [Boot] = 7, seclen of [Boot] = 6, secend of [Boot]=18 */
    /* the following stmt is search mbufpt size=mtail to find the pattern */
    /* secname, pattern length=seclen, return secstart=offset pos in mbufpt */
    /* it is the pos of '[' in mbufpt                                       */
    /****************** secname exists for sure ********************/
    testmode=0;
    secstart=compattern(mbufpt,mtail,secname,seclen);
    /* get section length from ']'+1 to next '['-1 */
// orig:   for(i=secstart+seclen,j=0;mbufpt[i]!='[' && i <= mtail; i++,j++);

for(i=secstart+seclen,j=0;mbufpt[i]!='[' && i <= mtail; i++,j++)
// 1139940a++++-+++-+++++++++++++++++ HNH
    {
        if (mbufpt[i]==' ' || mbufpt[i]==';') { // Skip any ' ' or ';' in
comments.
            i++;
            j++;
        if (mbufpt[i]!=0xd || mbufpt[i]!=0xa) { // Skip any CR or LF in
comments.
            i++;
            j++;
        }
      }
    }
    ;
// 1139940a------------------------- HNH //    for(i=secstart+seclen, j=0; i<=mtail; i++, j++)     // 1.00.02
//       {                                                // 1.00.02
//       if (mbufpt[i]=='=') equhere=1;                   // 1.00.02
//       if (mbufpt[i]=='\n') equhere=0;                  // 1.00.02
//       if (mbufpt[i]=='[' && equhere==0) break;         // 1.00.02
//       }                                                // 1.00.02
    testmode=1;
    recstart=compattern(&mbufpt[secstart+seclen],j,sbuf,equsign);
    secend=secstart+seclen+j;

while (mbufpt[secend-1] == 0xA && mbufpt[secend-2] == 0xD &&
           mbufpt[secend-3] == 0xA && mbufpt[secend-4] == 0xD)
```

Script.c  Page A-14

```
        secend-=2;
    if(recstart!=-1)
    {
        if (sbuf[equsign+1]=='~')
            recdelete(secstart+seclen+recstart);
// 1.00.03 start
        else if (sbuf[equsign+1]=='^')
        {
                findstart=secstart+strlen(secname)+1;
                findstart+=compattern(&mbufpt[findstart],j,sbuf,equsign);
                findend=strlen(sbuf);
                recsize=findend-equsign-1;        // # of char to be moved
                for (i=0;i<recsize;i++)           // remove keyword
                   sbuf[i]=sbuf[equsign+i+2];
                for(;(mbufpt[findstart]!='\n'; findstart==0);findstart--);
                if (mbufpt[findstart]=='\n')      // insert after CR, LF
                   findstart++;
                recsize--;
                middinsert(findstart);
                }
// 1.00.03 end
        else       /* replace = delete + insert */
        {
            recdelete(secstart+seclen+recstart);
            secend=secstart+seclen+recstart;
            (secend > mtail) ? endinsert() : middinsert(secend);
        }
    }
    else if (sbuf[equsign-1]=='#') /* next available number */
    {
        int   temp,max,num1,num2;
        char  asciibuf[5];
        max=0;
        testmode=0;
        for (i=secstart+seclen;i<secend;)
        {
            recstart=compattern(&mbufpt[i],j,sbuf,equsign-1);
            if (recstart!=-1)
            {
                num1=recstart+i+equsign-1;
                for (num2=0;mbufpt[num1]!='=';num1++,num2++)
                   asciibuf[num2]=mbufpt[num1];
                asciibuf[num2]='\0';
                temp=atoi(asciibuf);
                max=(max>temp)?max:temp;
                for (;mbufpt[num1]!='\n' && num1<secend;num1++);
                for (;mbufpt[num1]=='\n' && num1<secend;num1++);
                i=num1;
            }
            else
                i++;
        }
        max++;
        itoa(max,asciibuf,10);
        for(i=0;sbuf[i]!='#' && i<equsign;i++);
        /* if sbuf->group#=temp.grp, then equsign->7, i->6 */
        num1=recsize-i;
        for(j=0;j<num1;j++) sbuf[i+j]=sbuf[i+j+1];
        /* sbuf->group=temp.grp */
        recsize--;
        num2=strlen(asciibuf);
        for(j=0;j<num1;j++) sbuf[recsize+num2-j]=sbuf[recsize-j];/* move
backwards */
        /* sbuf->group# =temp.grp */
        sbuf[recsize+num2+1]='\0';
        for(j=0;j<num2;j++)
```

*Script.c* Page A-15

```
            sbuf[i+j]=asciibuf[j];
        recsize+=num2;
        (secend > mtail) ? endinsert() : middinsert(secend);
        }
// 1.00.03 start
    else if (sbuf[equsign+1]=='^')
        {
            findstart=secstart+strlen(secname)+1;
            findend=strlen(sbuf);
            recsize=findend-equsign-1;        // # of char to be moved
            for (i=0;i<recsize;i++)           // remove keyword
                sbuf[i]=sbuf[equsign+i+2];
            for(;(mbufpt[findstart]!='\n'|| findstart==0);findstart--);
            if (mbufpt[findstart]=='\n')      // insert after CR, LF
                findstart++;
            recsize--;
            middinsert(findstart);
        }
// 1.00.03 end
    else if (sbuf[equsign+1]!='~')
        (secend > mtail) ? endinsert() : middinsert(secend);
    else;
    }
```

*Script.c*  Page A-16

```
//-----------------------------------------------------------------------------
// Function : procdos
// Purpose: Read DOS lines.
// Called by: main
// Calls: chkrec, error, compatterns, recdelete, and C library functions.
//----------------------------------------------------------------------------- procdos()
{
    long    findstart,findend,recstart,temptr;
    long    i,j;
    size_t  equsign;
    char    *ptequ;

if (!iniexist) error(NOFILE_ERROR);

chkrec();

ptequ=strchr(sbuf,'=');
    equsign=ptequ-sbuf;       /* get the offset of '=' in sbuf[] */
    winmode=0;
    findstart=compattern(mbufpt,mtail,sbuf,equsign);
    if(findstart!=-1)
    {
        switch (sbuf[equsign+1])
        {
            case '~':   /* deletion */
                if (findstart > 0)
                {
                    for(i=findstart-1;mbufpt[i]!='\n' && i > 0; i--);
                    findend=(i==0?0:i+1);
                }
                else
                    findend=0;
                recdelete(findend);
                break;

case '\n':
            case ' ':
            case '\0':
                break;

case '+':                    // append function
                findend=strlen(sbuf);
                recsize=findend-equsign-1;      // # of char to be moved
                for (i=0;i<recsize;i++)         // remove keyword
                    sbuf[i]=sbuf[equsign+i+2];
                for(;mbufpt[findstart]!='\n';findstart++);   // end of line
                temptr=findstart-1;
                for(;(mbufpt[temptr]!='\n'|| temptr==0);temptr--);
                if (mbufpt[temptr]=='\n') temptr++;
                if ((findstart-temptr+recsize-1)>128) error(LEN_ERROR);
                findstart--;
                recsize--;
                append(findstart);
                break;

case '^':                    // insert before function
                findend=strlen(sbuf);
                recsize=findend-equsign-1;      // # of char to be moved
                for (i=0;i<recsize;i++)         // remove keyword
                    sbuf[i]=sbuf[equsign+i+2];
                for(;(mbufpt[findstart]!='\n'|| findstart==0);findstart--);
                if (mbufpt[findstart]=='\n')    // insert after CR, LF
                    findstart++;
                recsize--;
                middinsert(findstart);
```

Script.c Page A-17

```
                    break;

default:     /* insertion */
                findend=strlen(sbuf);
                recsize=findend-equsign-1;              // 1.00.02 - # of
char to be moved
                for (i=0;i<recsize;i++)
                    sbuf[i]=sbuf[equsign+i+1];
                for(;mbufpt[findstart]!='\n';findstart++);
                for(;mbufpt[findstart]=='\n';findstart++);
                if (findstart > mtail)
                    endinsert();
                else
                    middinsert(findstart);
                break;
        }
    }
    else
    {
        switch (sbuf[equsign+1])
        {
            case '~':
            case '\n':
            case ' ':
            case '+':
                break;

case '^':
                findend=strlen(sbuf);
                recsize=findend-equsign-1;
                for (i=0;i<recsize;i++)
                    sbuf[i]=sbuf[equsign+i+2];
                recsize--;
                middinsert(0);
                break;

default:
                findend=strlen(sbuf);
                recsize=findend-equsign-1;              // 1.00.02 - # of
char to be moved
                for (i=0;i<recsize;i++)
                    sbuf[i]=sbuf[equsign+i+1];
                endinsert();
                break;
        }
    }
}
```

*Script.c*

```
//----------------------------------------------------------------
// Function : append
// Purpose: Append the text in SBUF[] to MBUFPT[] at the position specified
//          by POS.
// Called by: procdos
// Calls: None.
//----------------------------------------------------------------
append(pos)
long pos;
{
   long  end,i,j;
   int   len;

end=mtail+recsize;           // # of char to be moved
   len=mtail-pos+1;
   for(i=0;i<len;i++)
      mbufpt[end-i]=mbufpt[mtail-i];
   i=pos;
   for(j=0;j<recsize;j++)
      mbufpt[i+j]=sbuf[j];
   mtail=end;
}
//----------------------------------------------------------------
// Function : middinsert
// Purpose: Append the text in SBUF[] to MBUFPT[] at the position specified
//          by POS.
// Called by: procdos
// Calls: None.
//----------------------------------------------------------------
middinsert(pos)      /* record insert into 'pos' */
long pos;
{
   long  end,i,j;
   int   len;

end=mtail+recsize+2;/* size to move+0d+0a */
   len=mtail-pos+1;
   for(i=0;i<len;i++)
      mbufpt[end-i]=mbufpt[mtail-i];
   i=pos;
   for(j=0;j<recsize;j++)
      mbufpt[i+j]=sbuf[j];
   mbufpt[i+j]='\x00d';
   mbufpt[i+j+1]='\x00a';
   mtail=end;
}
```

*Script.c* Page A-19

```
//----------------------------------------------------------------
// Function : endinsert
// Purpose: Append the text in SBUF[] to MBUFPT[].
// Called by: procdos
// Calls: None.
//----------------------------------------------------------------
endinsert()
{
   int   i;

for(i=0;i<=recsize;i++)
      mbufpt[mtail+i+1]=sbuf[i];
   mbufpt[mtail+i]='\x00d';
   mbufpt[mtail+i+1]='\x00a';
   mtail=mtail+recsize+2;
}
//----------------------------------------------------------------
// Function : recdelete
// Purpose: Delete the text in MBUFPT[] from the position specified by POS.
// Called by: procdos, procwin
// Calls: None.
//----------------------------------------------------------------
recdelete(pos)  /* pos=starting offset of a deleting entry in mbufpt */
long  pos;
{
   long  i,j;
   int   len;

for(len=0,i=pos;i<mtail;len++,i++) /* find entry length until \n */
      if(mbufpt[i]=='\n')
         break;
   /* plus the subsequent \n */
   for(;mbufpt[i]=='\n';len++,i++);
   for(i=pos,j=0;i<=mtail;i++,j++)
      mbufpt[pos+j]=mbufpt[pos+len+j];
   mtail=mtail-len;
   for(i=(mtail+1);i<msize;i++)   /* clear rest of buffer with blank */
      mbufpt[i]='\0';
}
```

Script.c   Page A-20

```
//-------------------------------------------------------------------
// Function : compattern
// Purpose: Compare two strings pointed by PATT1, PATT2. Lengths of the
//          strings are PATT1LEN and PATT2LEN. If matched, it returns the
//          offset of the string in PATT1.
// Called by: procdos, procwin
// Calls: C library calls.
//-------------------------------------------------------------------
compattern(patt1,patt1len,patt2,patt2len)
char   *patt1,*patt2;
long   patt1len;
int    patt2len;
{
   char  *ptr1, *ptr2;
   int   i,j,ch1,ch2;

ptr1=patt1;
   for(i=0; i<patt1len; i++)
   {
      ptr2=patt2;
      ch1=toupper(ptr1[i]);
      ch2=toupper(ptr2[0]);
      if (ch1==ch2)
      {
         for(j=0; j<patt2len; j++)
         {
            ch1=toupper(ptr1[i+j]);
            ch2=toupper(ptr2[j]);
            if (ch1==ch2)
               continue;
            else
               break;
         }
         if (j==patt2len)
         { /* testmode equals 0 -> section name compare */
            if (!winmode || !testmode) return(i); /* DOS mode or section */
            ch1=ptr1[i-1]; /* if it is unique */
            ch2=ptr1[i+j];
            if (ch1=='\n' && ch2=='=')
                return(i);
         }
      }
   }
   return(-1);          /* no match */
}
```

*Script.c* Page A-21

```
//-----------------------------------------------------------------
// Function : secinsert
// Purpose:  Insert the section.
// Called by: procdos, procwin
// Calls: C library calls.
//-----------------------------------------------------------------
secinsert()
{ sbuf[0]=0xD;                        // separate the new section from the others
    sbuf[1]=0xA;
    for(recsize=2;secname[recsize-2]!='\0';recsize++)    // move section name to SBUF[]
        sbuf[recsize]=secname[recsize-2];
    endinsert();                        // append it to the end
    while(recsize=getrec(fscript,sbuf)) // get next record
    {
        switch(sbuf[0])
        {
           case '$':                    // next file
           case '[':                    // next section
                return;

case '/':                    // comments
           case ';':
                break;

default:                     // append others to the end
                endinsert();
                break;
        }
    }
}
```

*Script.c*   Page A-22

```c
//------------------------------------------------------------------
// Function : error
// Purpose: Display the error message.
// Called by: main.
// Calls: C library calls.
//------------------------------------------------------------------
error(code)
int   code;
{
char c;              /* HNH001 */
FILE *h;
int errInit=0;
char *errLine;
char time[9],date[9];
char ia[2];
// 1139940A++++++++++++++++
    if (!errInit) {
       ferr = fopen("\\error.log","a+t");      // Append to the file.
       errInit=1;
    }
    printf("\nError code: %d\n",code);
    _strdate(date);
    strcpy(errLine,"\n   ");
    strcat(errLine,date);
    strcat(errLine,"   ");
    _strtime(time);
    strcat(errLine,time);
    fputs(errLine,ferr);
    fputs("          AST Script Error log (ICONFIX)",ferr);
    strcpy(errLine,"\n\nError # ");
    itoa(code,ia,10);
    strcat(errLine,ia);
    strcat(errLine," in script file: ");
    strcat(errLine,script);                    // Get file name.
    fputs(errLine,ferr);
    strcpy(errLine,"\nError line: ");
    strcat(errLine,sbuf);
    fputs(errLine,ferr);
// 1139940A---------------
    fputs("\n------------------\n",ferr);
    switch(code)
    {
        case  INPUT_ERROR:
              printf("Usage: SCRIPT <filename>\n");
              strcpy(errLine,"Usage: SCRIPT <filename>\n");
              break;

case  LINE_ERROR:
              printf("Error\n\nInvalid character at column 1\n--> %s\n",sbuf);
              strcpy(errLine,"Error\n\nInvalid character at column 1\n--> \n");
              strcat(errLine,sbuf);
              break;

case  INI_ERROR:
              printf("Error\n\nCannot open file %s\n",ininame);
              strcpy(errLine,"Error\n\nCannot open file \n");
              strcat(errLine,ininame);
              break;

case  EQUSIGN_ERROR:
              printf("Error\n\nInvalid character following '=' sign.\n--> %s\n",
                     sbuf);
              strcpy(errLine,"Error\n\nInvalid character following '=' sign.\n--> \n");
              strcat(errLine,sbuf);
              break;
```

*Script.c* Page A-23

```c
        case  NOEQU_ERROR:
              printf("Error\n\nMissing '=' sign.\n--> %s\n",sbuf);
              strcpy(errLine,"Error\n\nMissing '=' sign.\n--> %s\n");
              strcat(errLine,sbuf);
              break;

case  MEM_ERROR:
              printf("Error\n\nInsufficient memory.\n");
              strcpy(errLine,"Error\n\nInsufficient memory.\n");
              break;

case  WRITE_ERROR:
              printf("Error\n\nFailed to save file %s.\n",ininame);
              strcpy(errLine,"Error\n\nFailed to save file .\n");
              strcat(errLine,ininame);
              break;

case  SECTION_ERROR:
              printf("Error\n\nMissing section name.\n--> %s\n",sbuf);
              strcpy(errLine,"\nMissing section name.\n");
              strcat(errLine,sbuf);
              break;

case  NOFILE_ERROR:
              printf("Error\n\nMissing file name.\n--> %s\n",sbuf);
              strcpy(errLine,"Error\n\nMissing file name.\n--> \n");
              strcat(errLine,sbuf);
              break;

case  SCRIPT_ERROR:
              printf("Error: Cannot open file %s\n",script);
              strcpy(errLine,"Error: Cannot open file \n");
              strcat(errLine,script);
              break;

case  LEN_ERROR:
              printf("Error\n\nLine too long.\n");
              strcpy(errLine,"Error\n\nLine too long.\n");
              break;
   }
   fputs(errLine,ferr);

if (stricmp(getenv("LOG_FILE"),"NUL") != 0)     // 1139943A, HNH004
      printf("%c",0x7);

/* HNH002c+ No Pausing only if HDM group test has HDMGROUP=662 */ if (strcmp(getenv("HDMGROUP"),"662") == 0) {
      fputs("\n--------------------- End of Log File ------------------------",ferr);
      fclose(ferr);             /* close C:\ERROR.LOG file. */
      printf("\n\n*** Notice to Testing Group *** \n");
      printf("\nThere was a problem running SCRIPT.  Besides the .SPT");
      printf("\nfile having syntax errors, there may not be enough memory,");
      printf("\nor some files are missing.  Please read the C:\\ERROR.LOG.");
      printf("\nCall Hard Disk Master Group or your manager.\n");
      printf("\n\n Press <Enter> to continue...");
      printf("\n");
      close(hini);       /* close any files. */
      h=fopen("con","r"); /* Input file was re-directed.  Re-open it */
      printf("%c",0x7);
      c=getch(stdin);            /* Pause */
   }
/* HNH001c- */ exit(code);
} // end of file.
```

*Script.c* Page A-24

ATIM64.BAT

Script atim64.spt

```
                          |    ATIM64.SPT

;ATI Mach64 V1.4 script file, 2/2/95
;AST Research, 1995. HN Harding

%c:\AUTOEXEC.BAT
PATH=+;C:\MACH64

$c:\windows\PROGMAN.INI
[Groups]
Group#=C:\WINDOWS\ATIDESK.GRP $c:\windows\CONTROL.INI
[drivers.desc]
atirle.drv=ATI RLE Video Compressor
ativdacc.drv=ATI Video Accelerator
ativideo.drv=ATI Video Driver $c:\windows\SYSTEM.INI
[boot]
386grabber=macx.3gr
display.drv=macx.drv

[boot.description]
displayinf=OEMMACX.INF
display.drv=mach64 Driver

[386Enh]
display=macxvdd.386

[drivers]
VIDC.CVID=ativdacc.drv
VIDC.MSVC=ativdacc.drv
VIDC.IV31=ativdacc.drv
VIDC.MRLE=ativdacc.drv
VIDC.RT21=ativdacc.drv
VIDC.YVU9=ativdacc.drv ATIVIDEO=ativideo.drv
VIDC.RLE=ativdacc.drv
VIDC.DIB=ativdacc.drv

[Installable Compressors]
vidc.rle=ativdacc.drv

[ATI Interceptor]
MSVC=msvidc.drv
RT21=ir21_r.dll
IV31=ir30.dll
CVID=iccvid.drv
RLE=atirle.drv
MRLE=msrle.drv
```

ATIM64.SPT

```
YVU9=ir21_r.dll

[Macx]
DesktopSize=640x480
Dithering=on
Environment=Small Font
PaletteManager=on
PixelDepth=8
ScreenSize=640x480
VGADither=off %c:\windows\WIN.INI
load=+ C:\ATI\ATIDESK\ATIKEY.EXE
```

What is claimed is:

1. A method of software installation for installing software on a computer system through the use of installation modules tailored to specific hardware components of the computer system, said method comprising the steps of:

storing on at least one mass data storage device a plurality of software modules for downloading onto a hard disk drive, each software module comprising a software application program and a script file associated with said application program, said script file defining at least one change to a configuration of an operating system program previously stored on said hard disk drive, wherein said script file associated with said software application programs is created according to the following steps:

installing said operating system program onto a second data storage device;

saving data stored within one or more directories of said operating system program stored on said second data storage device to one or more temporary directories;

installing said software application onto said second data storage device, and effecting one or more requisite changes to said operating system program stored on said second data storage device;

comparing post-installation data stored within said one or more directories of said operating system program stored on said second data storage device with said data stored in said one or more temporary directories; and recording one or more changes to said operating system program resulting from said installation of said software application program within said script file;

selecting at least one software module for downloading onto the hard disk drive of a personal computer in accordance with hardware components included in said personal computer;

downloading said at least one selected software module onto the hard disk drive of said personal computer; and modifying said operating system according to said at least one change to a configuration defined by said script file.

* * * * *